United States Patent [19]

Kühnel

[11] 4,428,904
[45] Jan. 31, 1984

[54] BLOW-OFF DEVICE FOR LIMITING EXCESS PRESSURE IN NUCLEAR POWER PLANTS, ESPECIALLY OF THE BOILING WATER REACTOR-TYPE

[75] Inventor: Roland Kühnel, Dietzenbach, Fed. Rep. of Germany

[73] Assignee: Kraftwerk Union Aktiengesellschaft, Mulheim an der Ruhr, Fed. Rep. of Germany

[21] Appl. No.: 316,843

[22] Filed: Oct. 30, 1981

Related U.S. Application Data

[63] Continuation of Ser. No. 926,140, Jul. 19, 1978, abandoned.

[51] Int. Cl.³ .............................................. G21C 9/00
[52] U.S. Cl. .................................. 376/283; 376/316
[58] Field of Search ................................. 376/316, 283

[56] References Cited

U.S. PATENT DOCUMENTS

| | | | |
|---|---|---|---|
| 1,747,687 | 2/1930 | Wheeler | 261/124 |
| 3,115,450 | 12/1963 | Schanz | 376/316 |
| 3,164,644 | 11/1965 | Ghetto et al. | 261/124 |
| 4,022,655 | 5/1977 | Gaoditz et al. | 376/316 |
| 4,139,413 | 2/1979 | Simon et al. | 376/316 |
| 4,158,603 | 6/1979 | Kuhnel | 376/316 |
| 4,172,009 | 10/1979 | Simon et al. | 376/316 |
| 4,202,731 | 5/1980 | Simon et al. | 376/316 |
| 4,213,824 | 7/1980 | Jabsen | 376/316 |
| 4,305,896 | 12/1981 | Tominaga et al. | 376/316 |

FOREIGN PATENT DOCUMENTS

| | | | |
|---|---|---|---|
| 2212761 | 10/1973 | Fed. Rep. of Germany | 376/316 |
| 2403668 | 7/1975 | Fed. Rep. of Germany | 376/316 |
| 2616831 | 8/1977 | Fed. Rep. of Germany | 376/316 |
| 2616830 | 8/1977 | Fed. Rep. of Germany | 376/316 |

Primary Examiner—Sal Cangialosi
Attorney, Agent, or Firm—Herbert L. Lerner

[57] ABSTRACT

In a blow-off device for limiting excess pressure in nuclear power plants, at least one condensation tube disposed so that a lower outlet end thereof is immersed in a volume of cooling water in a condensation chamber having a gas cushion located in a space above the volume of cooling water, and the upper inlet end of the condensation tube extending out of the volume of cooling water and being connectible to a source of condensing steam or a steam-air mixture, the outlet end of the condensation tube being provided with an insert for smoothing the condensation, said insert comprising wall portions forming storage chambers distributed over the length of said tube outlet end and having overflow edges for the cooling water, whereby a spraying action multiplying the heat-transfer surface between the cooling water and a flow of the steam is releasable at said overflow edges when cooling water received in said storage chambers is alternatingly depleted and replenished due to pressure and water-level fluctuations within the condensation tube induced by condensation.

2 Claims, 6 Drawing Figures

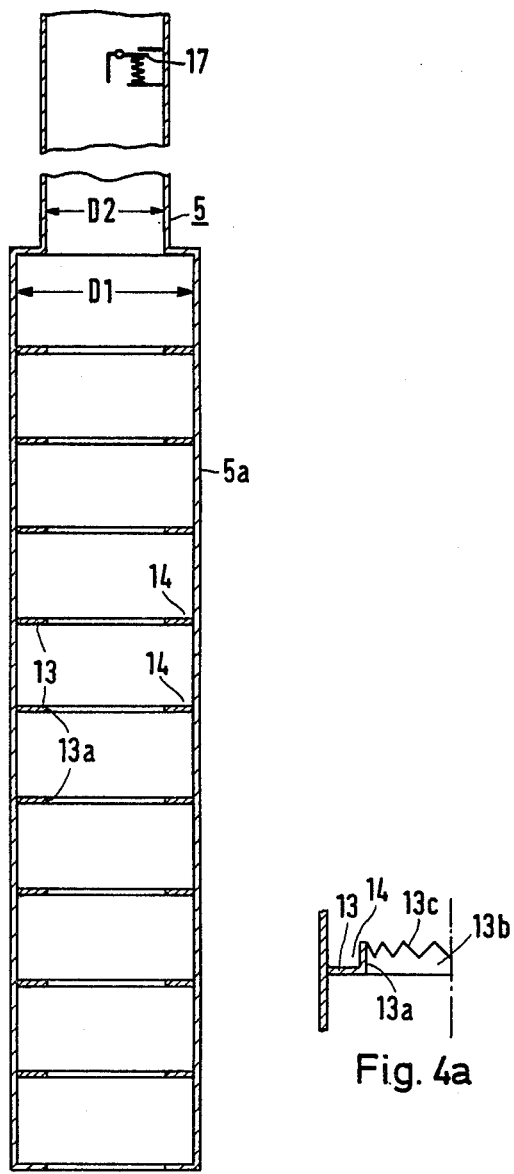
Fig. 4
Fig. 4a
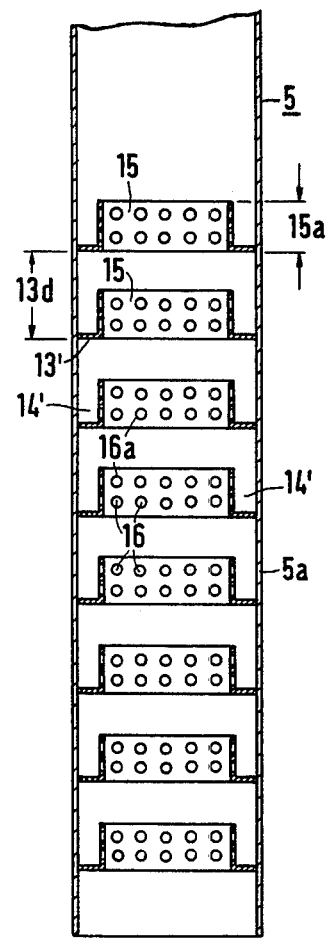
Fig. 5

BLOW-OFF DEVICE FOR LIMITING EXCESS PRESSURE IN NUCLEAR POWER PLANTS, ESPECIALLY OF THE BOILING WATER REACTOR-TYPE

This is a continuation of application Ser. No. 926,140 filed July 19, 1978, now abandoned.

The invention relates to a relief or blow-off device for limiting overpressure or excess pressure in nuclear power plants, especially in boiling-water reactor nuclear power plants, having at least one condensation tube which is immersed with its lower outlet end in a volume of water in a condensation chamber (water pool) having a gas cushion located in a space above the volume of water, and with its upper inlet end extending out of the volume of water and being connectible to a source of condensing steam or a steam gas-mixture, the outlet end of the condensation tube being provided with an insert for calming down or smoothing the condensation (preventing large steam bubbles from emerging into the water pool and structural stresses connected therewith during non-stationary condensation).

The invention is based on the discovery that the hereinaforementioned goal can be achieved in a particularly simple and effective manner if the cooling surface and the coolant turbulence are increased to such an extent that the steam is, in essence, cooled by water sprays while yet in the tube, and the heated coolant is exchanged through pumping operations from the non-stationary condensation by coolant from the water pool or volume of water. According to the invention, it was further discovered that the high underpressure waves produced in the process can serve for the occasional sniffing or breathing of air and thereby, for increasing the air content in the steam, so as to reduce thereby the stress on the structure.

It is accordingly an object of the invention to provide a blow-off device for limiting excess pressure in nuclear power plants, especially of the boiling water reactor-type which is simply and more effective than heretofore known blow-off devices of this general type.

With the foregoing and other objects in view, there is provided in accordance with the invention, in a blow-off device for limiting excess pressure in nuclear power plants, at least one condensation tube disposed so that a lower outlet end thereof is immersed in a volume of cooling water in a condensation chamber having a gas cushion located in a space above the volume of cooling water, and the upper inlet end of the condensation tube extending out of the volume of cooling water and being connectible to a source of condensing steam or a steam-air mixture, the outlet end of the condensation tube being provided with an insert for smoothing the condensation, the insert comprising wall portions forming storage chambers distributed over the length of the tube outlet end and having overflow edges for the cooling water whereby a spraying action multiplying the heat-transfer surface between the cooling water and a flow of the steam is releasable at the overflow edges when cooling water received in the storage chambers is alternatingly depleted and replenished due to pressure and water-level fluctuations within the condensation tube induced by the condensation. What is achieved thereby is that during the sucking-in process, the inserts distribute cold water from the water pool so finely in the region of non-stationary condensation that an enlarged heat transfer surface is produced which reduces the pressure in the pressure chamber to a very great extent and thereby triggers or releases a strong suction process, which stores this cooling water and injects it again during the discharge process, in finely distributed form, into the steam space being vacated, and sprays down the steam present in the pressure chamber to such an extent that the pressure decreases to an extent that the discharging water column nearly comes to a standstill at the end of the tube, and the formation of large steam bubbles below the tube is thereby prevented.

In accordance with another feature of the invention, the condensation tube has a breather valve at the upper inlet end thereof extending out of the water. In this connection, reference may be had to German Pat. No. 221212 761. By such a construction, the pressure is reduced to the extent that, during the drawing or sucking-in process, air is sucked-in within the upper part of the condensation tube, which reduces the condensation rates and prevents rapid collapse of large steam bubbles at the end of the tube.

In accordance with a further feature of the invention, a perforated tube is received coaxially within the condensation tube and defines therewith an annular gap, the annular gap forming a ring chamber closed at the lower outlet end of the condensation tube, and the perforated tube being closed at the end thereof disposed within the condensation tube and facing toward the upper inlet end thereof, the storage chambers being formed by the ring chamber, and the overflow edges being formed by edges of respective holes formed in the perforated tube.

In accordance with an added feature of the invention, the insert comprises a hollow conical member coaxially received in the tube outlet end with the apex of the cone directed toward the interior of the condensation tube, the hollow conical member and the condensation tube defining therebetween a ring chamber narrowing down to the tube outlet end and being closed thereat, the hollow conical member being closed at the apex thereof, the storage chambers being formed by the ring chamber, and the overflow edges being formed by edges of respective lateral holes formed in the hollow conical member.

In accordance with an additional feature of the invention, the blow-off device includes a plurality of mutually spaced ring orifice plates disposed at the inner periphery of the tube outlet end, the ring orifice plates at an upper surface thereof forming respective niches with the inner peripheral surface of the condensation tube, the niches being comprised of the storage chambers, and the overflow edges being formed by edges of the orifices of the orifice plates.

In accordance with yet another feature of the invention, respective perforated-tube sections are disposed at the inner periphery of the ring orifice plates, the perforated-tube sections having an axial length, respectively, extending over part of the axial spacing between a respective ring orifice plate and the ring orifice plate located next above it, the storage chambers being enlarged by the perforated tube sections, and the overflow edges being formed by edges defining holes formed in the perforated tube sections.

In accordance with a concomitant feature of the invention, the insert narrows down the flow-through cross section of the condensation tube and is disposed as an advance insert at the tube outlet end, and including a tubular member disposed therebehind and having wall portions extending substantially in axial direction of the condensation tube, the wall portions subdividing into a plurality of parallel partial flows a main flow of water to be blown off which leaves the advance insert.

Other features which are considered as characteristic for the invention are set forth in the appended claims.

Although the invention is illustrated and described herein as embodied in blow-off device for limiting excess pressure in nuclear power plants, especially of the boiling water reactor-type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

FIG. 4 is a view similar to those of FIGS. 2 and 3 of a third embodiment of the condensation tube having ring diaphragms or orifices as the components built into the outlet end;

FIG. 4a is a fragmentary view of FIG. 4 showing a modification thereof with serrated angle tube orifices or diaphragms;

FIG. 5 is another view similar to those of FIGS. 2, 3 and 4, of yet another embodiment having perforated tube members at the inner periphery of the ring orifices or diaphragms.

Figure 1:
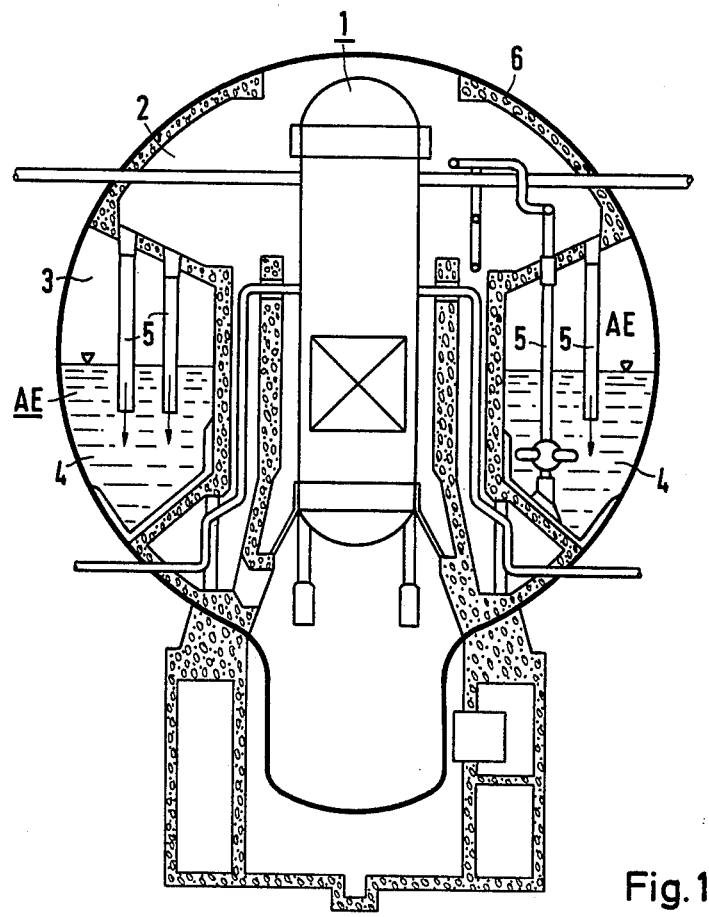
FIG. 1 is an overall diagrammatic sectional view of the containment of a nuclear reactor with pressure reduction system and relief a blow-off device.

Referring now to the drawing and first, particularly, to FIG. 1 thereof, there is shown a relief or blow-off device AE such as for a boiling-water reactor pressure vessel 1 for limiting overpressure, in nuclear power plants and including primarily a pressure chamber 2, a condensation chamber 3 and condensation tubes 5 immersed in a volume of water (water pool) in the condensation chamber 3. The entire system is integrated in a containment or safety vessel 6. It is the main purpose of such a pressure reduction system to reduce or suppress the steam, which flows out of the reactor pressure vessel 1 in the event of loss of coolant, by rapid condensation thereof in the water pool 4.

The facilities of the pressure suppression or reduction system, however, are used to advantage also for other purposes. Thus, the steam of the pressure relief and safety valves is likewise conducted into the water pool through suitable condensation tubes. Also, exhaust steam from emergency condensation and emergency feed turbines is advantageously conducted into the condensation chamber since it is assumed that the main condenser is no longer available when these turbines are committed or set into operation.

For the condensation process, it is important that a very wide spectrum of possible steam flow densities be present. Thus, if the relief valves should discharge, high steam flow densities would then be present in the corresponding condensation tubes, which would also be true at the beginning of a loss of coolant accident. In the exhaust steam lines of the emergency condensation and emergency feed turbines as well as in the corresponding condensation tubes, the steam flow densities are comparatively low for some time after a coolant-loss accident. Thus, the occurring steam flow densities extend from about 1000 kg/m$^2$ sec when the relief valves discharge or blow off, down to 1 kg/m$^2$ sec at the end of MHA cases or in the event of small leaks; over this large range, jet condensation occurs for very large m, non-stationary condensation for medium m (which raises the worst problems) and condensation through heat transfer and convection (very small m).

Figure 2:
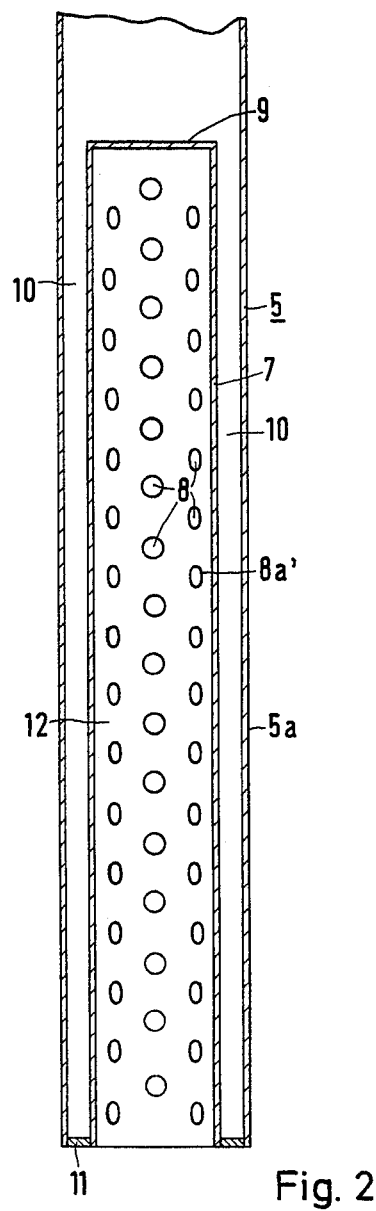
FIG. 2 is an enlarged fragmentary view of FIG. 1 showing in longitudinal section a partial length of the outlet end of a condensation tube.

In the outflow end 5a of the condensation tube 5, shown by way of example in FIG. 2, an embodiment of the blow-off device according to the invention is illustrated. Disposed within the condensation tube 5 of FIG. 2 is a concentric or coaxial inner tube 7, which is provided with openings 8 therein over the length thereof and is therefore referred to hereinafter as a perforated tube. The perforated tube 7 is closed off at the upper end thereof, as viewed in FIG. 2, by a cover 9, and an annular cylindrical space 10 surrounding the perforated tube 7 is closed off at the lower end thereof by a ring cover 11; a space 12 is thus formed within the tube 7 and the space 10 between the tube 7 and the tube 5a of the condensation tube 5. Cooling water entering into the space 12 due to a pressure difference between the space 10 in the tube end 5a of the tube 5 and the pressure chamber space 12 passes through the openings 8 and consequently cools the steam within the space 10 so that the pressure therein drops further and ensures vigorous suction. Depending upon the adjusted or set parameters, the water column in the space 12 attains a maximal elevation and drops again due to the pressure reversal. The column in the space 12 drops faster than in the space 10, and the water stored in the space 10 sprays water through the openings 8 formed in the tube 7 into the steam present in the space 12, reducing the excess pressure or overpressure therein, so that the water column running out of the space 12 loses speed and takes on no value or only insignificant values at the tube end 5a. Thus, no steam bubble or only a very small steam bubble is formed at the tube end 5a and causes only negligible structural stresses. Storage chambers are formed, in this regard, by the annular space 10, and overflow edges are formed by the hole edges 8a defining the openings 8.

Figure 3:
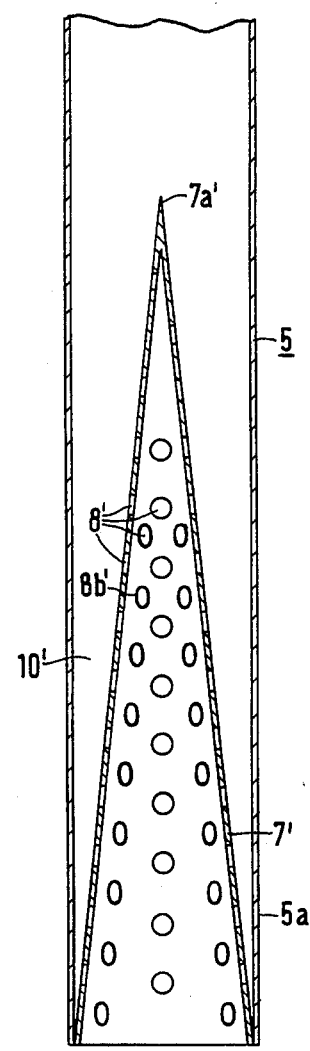
FIG. 3 is a view similar to that of FIG. 2 showing a different embodiment of the condensation tube wherein a perforated hollow cone is used as a built-in component instead of a perforated hollow cylinder.

According to the embodiment of FIG. 3, a perforated hollow cone 7' is inserted into the outlet end 5a of the condensation tube 5, with the apex 7a' of the hollow core insert 7' pointing into the interior of the condensation tube 5. The annular space 10', which is formed between and defined by the hollow cone 7' and the condensation tube 5, becomes narrower toward the outlet side thereof, and is closed off near the base of the hollow cone 7', while the latter again is, in turn, closed off at the apex 7a' thereof, the storage chambers being formed by the annular space 10', and the overflow edges being formed by the hole edges 8b' defining the opening 8'. The manner of operation of the embodiment of FIG. 3 is similar to that of the embodiment according to FIG. 2; in addition, the speed or rate of spraying down into the constriction zones of the hollow cone 7' and the annular space 10' is advantageously increased.

In the third embodiment according to FIG. 4, a number of ring orifices 13 are disposed with mutual spacing at the inner periphery of the tube outlet end 5a, preferably distributed uniformly as shown. The inner diameter D1 of the tube outlet end 5a is formed larger in the embodiment of FIG. 4 than the inner diameter D2 of the condensation tube 5, so that the inner diameter 5a, taking into consideration the inner diameter of the orifices 13, corresponds approximately to the inner diameter D2 of the condensation tube 5. The storage chambers are formed in this embodiment of FIG. 4, by the respective niches 14 on the upper side, as viewed in FIG. 4, between the ring orifices 13 and the wall of the tube outlet end 5a; the overflow edges are formed by the inner periphery 13a defining the respective ring orifice 13. It may be advantageous to decrease the mutual spacing of the ring orifices 13 at the tube outlet end 5a as well as the inner diameter of the ring orifices 13 and, in fact, for a given lower mass flow range; for other, higher mass flow range, it may be advantageous to increase the aforementioned parameters. The optimum values are determinable individually by suitable testing performable by anyone of ordinary skill in the art.

FIG. 4a shows that, in accordance with a variation of FIG. 4, the inner periphery of the ring orifices 13 may be constructed in the form of a serrated inner ring 13b, with serrations 13c which act as overflow edges; the storage chambers 14 being increased therein by an angle-ring type construction of the ring orifices 13.

In yet another embodiment of the invention according to FIG. 5, there are disposed, at the inner periphery of the ring orifices 13', sections 15 of perforated tubes 15, the axial length 15a of which extends over part of the axial spacing 13d between mutually adjacent ring orifices 13'. The perforated tube sections 15 are formed with holes 16; the edges 16a of the holes 16 form the overflow edges. The storage chambers are formed, in the embodiment of FIG. 5, in the space between the inner peripheral surface of the condensation tube 5, the outer peripheral surface of the perforated tube sections 15 and the upper side of the ring orifices 13', as viewed in FIG. 5.

In the upper part of FIG. 4, there is also shown diagrammatically, the disposition of a breather valve 17, as is known per se from FIG. 4 of the German Published Prosecuted Application DE-AS No. 2 212 761. This breather valve can, of course, be used in all of the embodiments of the invention in this application.

According to a further embodiment of the invention, the device according to the invention with the cross section-narrowing built-in components can serve as an advance insert followed in the outlet region of the condensation tube 5 by a conventional tube attachment or insert which has wall parts extending substantially in axial direction of the condensation tube 5 and by which the mass flow to be blown off, which leaves the advance insert, is subdivided into a large number of parallel substreams as was proposed heretofore by an earlier U.S. application Ser. No. 774,945 of Mar. 7, 1977 by the inventor of the instant application.

I claim:

1. In a blow-off device for limiting excess pressure in nuclear power plants, at least one condensation tube having an upper inlet end and disposed so that a lower outlet end thereof is immersed in a volume of cooling water in a condensation chamber having a gas cushion located in a space above the volume of cooling water, and the upper inlet end of the condensation tube extending out of the volume of cooling water and being connectible to a source of condensing steam or a steam-air mixture, a perforated tube received coaxially within the condensation tube for smoothing the condensation and defining therewith an annular gap, said annular gap forming a ring chamber closed at said lower outlet end of the condensation tube, and said perforated tube being closed at the end thereof disposed within said condensation tube and facing toward said upper inlet end thereof, said perforated tube comprising wall portions forming storage chambers distributed over the length of said tube outlet end, said wall portions having edges over which the cooling water flows, said storage chambers being formed by said ring chamber, and said edges defining respective holes formed in said perforated tube whereby a spraying action multiplying the heat-transfer surface between the cooling water and a flow of the steam is releasable at said overflow edges when cooling water received in said storage chambers is alternatingly depleted and replenished due to pressure and water-level fluctuation within the condensation tube induced by the condensation.

2. In a blow-off device for limiting excess pressure in nuclear power plants, at least one condensation tube having an upper inlet end and disposed so that a lower outlet end thereof is immersed in a volume of cooling water in a condensation chamber having a gas cushion located in a space above the volume of cooling water, and the upper inlet end of the condensation tube extending out of the volume of cooling water and being connectible to a source of condensing steam or a steam-air mixture, the outlet end of the condensation tube being provided with a tubular conical insert for smoothing the condensation, said tubular conical insert being coaxially received in said tube outlet end with the apex of the cone directed toward the interior of the condensation tube, said conical tubular insert and the condensation tube defining therebetween a ring chamber narrowing down to said tube outlet end and being closed thereat, said tubular conical insert being closed at said apex thereof, said storage schmbers being formed by said ring chamber and comprising wall portions forming storage chambers distributed over the length of said tube outlet end, said wall portions having overflow edges for the cooling water formed by edges of respective lateral holes formed in said tubular conical insert, whereby a spraying action multiplying the heat-transfer surface between the cooling water and a flow of the steam is releasable at said overflow edges when cooling water received in said storage chambers is alternatingly depleted and replenished due to pressure and water-level fluctuations within the condensation tube induced by the condensation.

* * * * *